United States Patent [19]

Herring

[11] Patent Number: 5,160,911

[45] Date of Patent: Nov. 3, 1992

[54] TOROIDAL CONSTANT-TENSION SUPERCONDUCTING MAGNETIC ENERGY STORAGE UNITS

[75] Inventor: J. Stephen Herring, Idaho Falls, Id.

[73] Assignee: The United States of America as represented by the United States Department of Energy, Washington, D.C.

[21] Appl. No.: 605,097

[22] Filed: Oct. 26, 1990

[51] Int. Cl.⁵ .............................................. H01F 7/22
[52] U.S. Cl. ................................... 335/216; 335/299; 505/879
[58] Field of Search ............... 335/216, 296, 297, 299; 505/879, 888; 323/360; 336/DIG. 1; 376/142

[56] References Cited

U.S. PATENT DOCUMENTS

| | | | |
|---|---|---|---|
| 3,701,906 | 10/1972 | Denel | 336/DIG. 1 |
| 4,122,512 | 10/1978 | Peterson | 363/14 |
| 4,268,353 | 5/1981 | Powell et al. | 376/142 |
| 4,392,918 | 7/1983 | Gaines | 376/133 |
| 4,920,095 | 4/1990 | Ishigaki | 335/216 X |
| 4,939,444 | 5/1990 | Cachenx | 323/360 |

Primary Examiner—Leo P. Picard
Assistant Examiner—Trinidad Korka
Attorney, Agent, or Firm—Mark P. Dvorscak; Robert J. Fisher; William R. Moser

[57] ABSTRACT

A superconducting magnetic energy storage unit is provided in which the magnet is wound in a toroidal fashion such that the magnetic field produced is contained only within the bore of the magnet, and thus producing a very low external field. The superconducting magnet includes a coolant channel disposed through the wire. The bore of the magnet comprises a storage volume in which cryogenic coolant is stored, and this volume supplies the coolant to be delivered to the coolant channel in the magnet.

8 Claims, 2 Drawing Sheets

TOROIDAL CONSTANT-TENSION SUPERCONDUCTING MAGNETIC ENERGY STORAGE UNITS

CONTRACTUAL ORIGIN OF THE INVENTION

The United States Government has rights in this invention pursuant to Contract No. DE-AC07-76IDO1570 between the U.S. Department of Energy and EG&G Idaho, Inc.

BACKGROUND OF THE INVENTION

The present invention relates generally to superconducting magnetic energy storage (SMES) units, and more particularly to a superconducting magnetic energy storage unit wound in a toroidal fashion such that the magnetic field is contained within the bore of the magnet, thus producing a very low external field.

Superconducting magnetic energy storage (SMES) units have a number of advantages as storage devices. Electrical current is the input, output, and stored medium, which allows for complete solid-state energy conversion. The magnets themselves have no moving parts. Round-trip efficiency is higher than those parts for batteries, compressed air, or pumped hydro. Output power can be very high, allowing complete discharge of the unit within a few seconds. Finally, the unit can be designed for a very large number of cycles, limited essentially by fatigue in the structural components. Basically, two types of magnets have been studied: the solenoid, a circular loop of conductor; and the toroid, in which the circular or D-shaped coils are arranged in a circle to produce a doughnut-shaped field. A solenoid produces a magnetic field, B, which is external of the magnet, whereas a toroid produces a magnetic field that is contained within the magnet's bore.

Present U.S. SMES designs foresee stationary machines having a vertical-axis solenoidal magnet located underground. Large solenoidal magnets produce a significant external field and thus preclude mobile and space-borne applications. In mobile uses, the external field would induce eddy currents in nearby conducting structures such as bridges, reinforcing rods and light poles, thereby dissipating some of the stored energy. In addition, members of the public wearing pacemakers or other field-sensitive devices may be nearby and possibly effected. In space applications, the external field of the solenoid would funnel charged cosmic particles to the spacecraft, exposing the crew and instrumentations to higher radiation exposures. Additionally, large solenoidal coils must be wound on site and cannot generally be manufactured as transportable modules in a factory.

The discovery of high temperature superconductors and improvements in conventional superconductors has generated renewed interest in the use of intense magnetic fields for energy storage using either solenoids or toroids. The relative merits of these types of magnets have been compared, and it has generally been concluded that a solenoid is preferable in terms of energy stored per unit mass of superconductor and structure. Most of the SMES design studies in the United States has focussed on solenoids.

However, toroidal magnets, which require approximately twice as much superconductor and structure per unit of stored energy as a solenoid, have several advantages. Because the field is closed within the bore of the magnet, the external field is very small. Generally, the external field is a product only of the toroid being composed of several individual coils, rather than a continuous current sheet. Leads and winding irregularities also produce small external fields. In mobile applications where the external field would produce eddy currents in roadside conductors, or in urban stationary applications where the external field would have to be limited, a toroidal magnet may be more appropriate. Additionally, a toroidal magnet is much more amenable to factory winding and fabrication. A toroidal SMES can be composed of several individual coils which would be fabricated and tested in a factory, transported by truck or rail to the site, and placed to form a circular arrangement. Thus, by approaching an ideal toroidal current sheet, co-locating current leads and minimization of winding irregularities, the external field can be reduced to very low levels.

Magnetic energy storage units have many applications, an example of which is a buffer for the kinetic energy of an automobile, bus, or railcar. In this example, about 30 kW of power is required to comfortably accelerate a small automobile into traffic, but only about 8.5 kW is required to maintain the automobile at 55 mph on level pavement. Therefore, an automobile engine spends most of its time operating relatively inefficiently. Additionally, the present internal combustion engine does not allow for regenerative braking. Although battery-powered automobiles have certain advantages to offset the problems of the internal combustion powered automobile, they are often hampered by poor acceleration due to limitations on instantaneous current. Battery lifetime is limited by the total number of cycles and the battery has a limited ability to absorb energy in regenerative braking. One possible way to circumvent these difficulties is to use a short-term, high specific power energy storage device.

Accordingly, it is an object of the present invention to provide a toroidal superconducting magnetic energy storage unit such that the magnetic field produced is contained within the bore of the magnets and in which the external magnetic field is very low.

It is another object of the present invention to provide a toroidal superconducting magnetic energy storage unit which does not rely on external structures for support, except for normal gravity and inertial forces.

Yet another object of the present invention is to produce self-consistent designs for toroidal superconducting magnetic energy storage units.

A further object of the present invention is to provide an SMES which has wide applicability, from providing a buffer for the kinetic energy of a car, bus, or railcar, to providing a power source for an electromagnetic launcher.

SUMMARY OF THE INVENTION

This invention provides a superconducting magnetic energy storage unit which comprises a plurality of superconducting magnets toroidally wound, the magnets connected together to form a substantially cylindrical shape having an inner bore, and the magnets each including: superconducting wire surrounded by a first support structure; and electrical insulation surrounding the wire and first support structure; a second support structure cylindrically shaped and disposed within the superconducting magnets for supporting the magnets, and wherein energy is stored in a magnetic field by applying a current to the magnet, and further in which energy is withdrawn from the magnet by reducing the input current, the magnetic field being contained only within the bore of the magnet. The superconducting magnets are suspended in a metal shell containing thermal insulation. The superconducting wire includes a channel containing cryogenic coolant, and the bore of the magnets includes a volume for storing cryogenic coolant to be supplied to the channel in the superconducting wire.

In another embodiment, an automotive vehicle has a battery producing an electrical output, and a superconducting magnetic energy storage unit is provided for augmenting the electrical output of the battery. The superconducting magnetic energy storage unit comprises: a superconducting magnetic coil wound toroidally, having an inner bore, and in which energy is stored in a magnetic field by applying a current to the magnet, and further in which energy is withdrawn from the magnet by reducing the current, the magnetic field being contained only within the bore of the magnet. The superconducting coil includes a cryogenic coolant channel, and the inner bore of the magnet includes a volume for storing cryogenic fluid to be supplied to the coolant channel, whereby the superconducting magnetic energy storage unit is cooled by the cryogenic coolant. The unit is capable of storing energy sufficient to accelerate the vehicle to about seventy milers per hour. Additionally, the unit is capable of being recharged during regenerative braking of the vehicle, thereby recovering energy needed for subsequent acceleration.

BRIEF DESCRIPTION OF THE DRAWINGS

The above-mentioned and other features of the invention will become more apparent and best understood, together with the description, by reference to the accompanying drawings, in which:

FIG. 3b is an elevational view of the cylindrically arranged magnets of FIG. 3a;

DETAILED DESCRIPTION OF THE INVENTION

Figure 1:
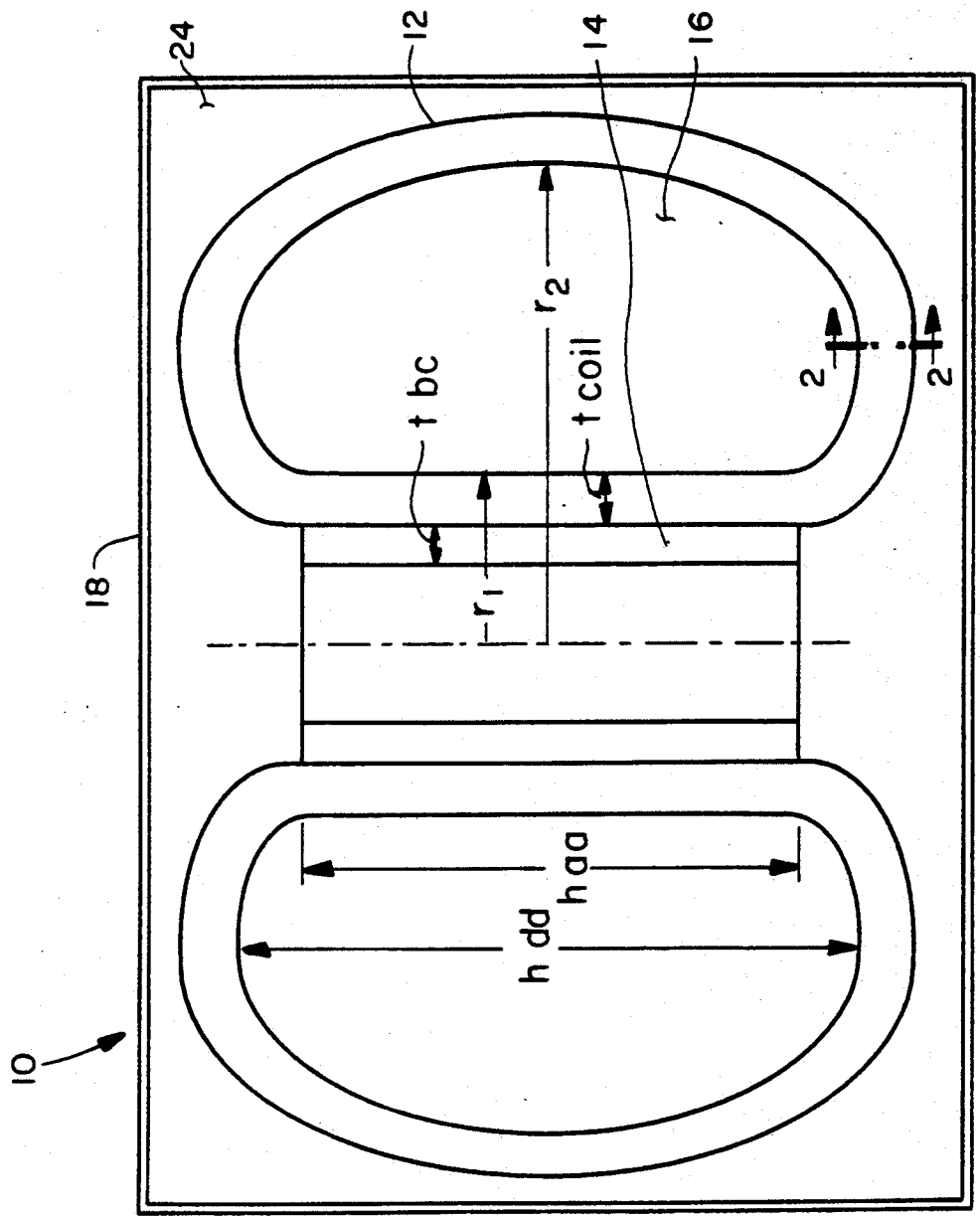
FIG. 1 shows the generalized geometry of a D-shaped toroidal magnet in accordance with the present invention.

Referring to FIG. 1, there is shown a Toroidal Superconducting Energy Magnetic Storage (SMES) Unit 10 in accordance with the present invention. The SMES includes a constant tension superconducting toroidal magnet 12 having a D-shaped coil. The D-shape of the coil is preferable because the outer section of the coil requires no additional structure to preserve that shape. The magnet 12 surrounds a central support structure, or bucking column 14, which bears the center force along the straight section of the coil. The bucking column 14 is a cylinder manufactured from either steel or aluminum, depending on the intended application of the SMES. The magnet 12 is suspended in a cylindrical metal shell 18, which protects the magnet during use. Porous thermal insulation 24, for example Perlite 80 mesh, fills the volume between the magnet 12 and the outer shell 18.

The cross-section of the magnet is illustrated in FIG. 3. As shown, the superconducting magnet 12 is a wire having a square or rectangular cross section. It can include a silicone carbide fiber in an aluminum matrix. Other fiber and matrix composites for the superconducting magnet are possible, and representative properties of these alternatives are listed in Table 1.

TABLE 1

Representative Properties of Some Reinforced Metal Matrix Composites

| Fiber | Matrix | Density (kg/m$^3$) | Axial Tensile Strength (GPa) | Wm/Mm (kJ/Kg) (4) |
|---|---|---|---|---|
| None | Al (1) | 2713 | 0.29 | 32 |
| P120 | Al | 2491 | 0.69 | 83 |
| Boron | Al | 2630 | 1.24 | 140 |
| SiC (2) | Al | 2934 | 1.24 | 130 |
| SiC (3) | Al | 2657 | 1.03 | 120 |
| Alumina | Al | 3598 | 0.62 | 52 |
| SiC | Ti | 3600 | 1.72 | 140 |

Notes:
(1) 6061 T6
(2) Monofilament
(3) Multifilament yarn
(4) 60% Structure/Stabilizer; 10% Superconductor; 20% Coolant; 10% Insulation.

The magnet is surrounded by a stabilizer structure 20, which can include Aluminum with Silicon Carbide fibers. Surrounding the stabilizer structure 20 is a layer of electrical insulation 22, such as kaptan plastic. The magnet 12 also includes a cryogenic coolant channel 26 disposed through its center for convective cooling of the superconducting magnet. The bore of the coil 16 serves as a reservoir or storage volume for the cryogenic fluid, preferably liquid helium or liquid nitrogen, which is delivered to the coolant channel 26 by means not shown. The SMES is designed to operate without an active refrigeration system, using only the coolant capacity of the reservoir 16.

The magnet is wound in a toroidal fashion, such that the magnetic field is entirely contained within the bore of the magnets. The external magnetic field is very low (theoretically zero except for leads and winding irregularities). Energy is stored in the magnetic field as a current is applied to the windings. Energy is withdrawn from the unit when the current is reduced by introducing a load in series with the windings. The output power from the superconducting magnet is limited primarily by the turn-to-turn insulation within the coil, and insulation between the leads as they emerge from the winding. Typical medium scale magnets can be discharged in approximately 26 kW/kg for the disclosed SiC/Al High Temperature Superconducting magnet. The maximum number of cycles is limited by the fatigue life of the insulation and the coil structure, rather than chemically by the superconductor itself.

Figure 3C:
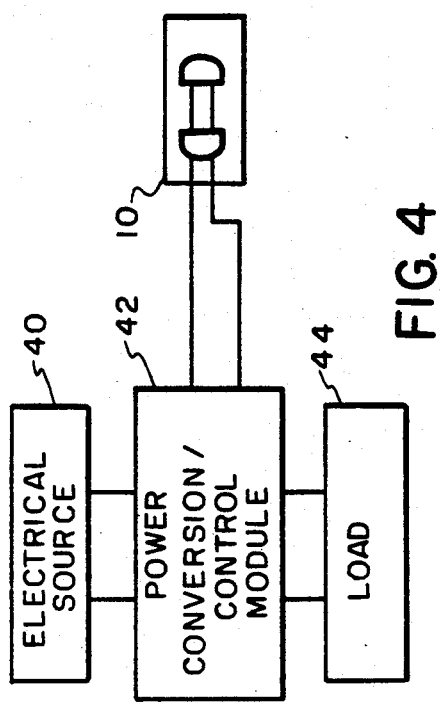
FIG. 3c shows two magnets separated from the arrangement of FIG. 3a being transported by ground; and, FIG. 4 shows a schematic electrical circuit of a simple toroidal superconducting magnetic energy storage unit.
Figure 3A:
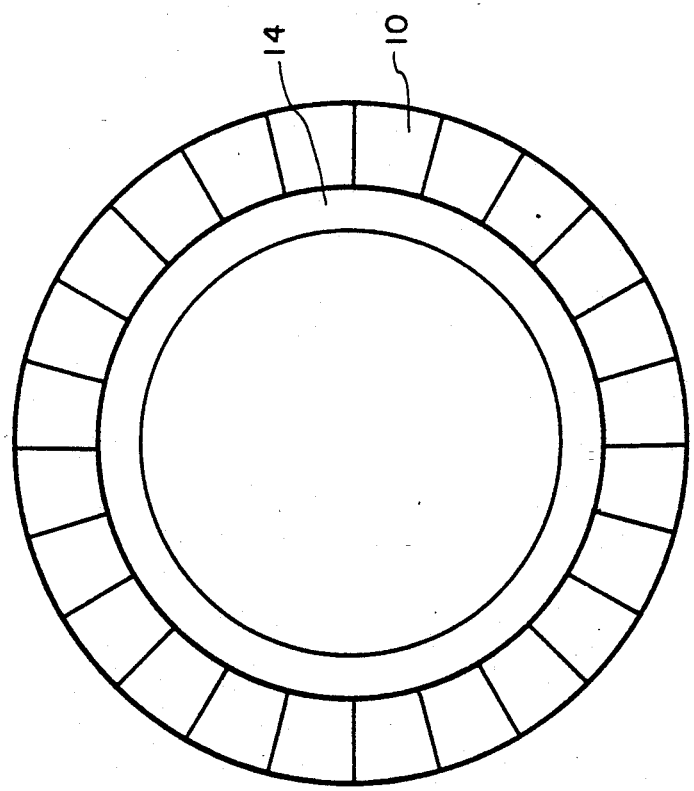
Figure 3B:
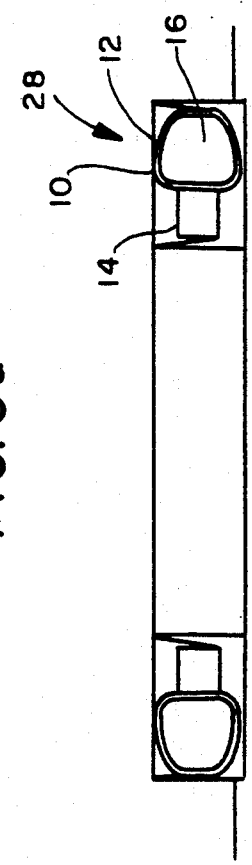

An embodiment for a contemplated application of the invention is illustrated in FIGS. 3a–3c. A plurality of superconducting magnets 12 are constructed in accordance with the present invention and fabricated as modules 28. The modules 28 are arranged to form a substantially cylindrical shape having an inner bore 16 as shown by FIGS. 3a and 3b. A cylindrical support structure 14 is disposed within the magnets, and this structure bears the force of the magnets. In FIG. 3c there is shown two modules 28, separated from the cylindrical arrangement of FIG. 3a. These modules are being transported by ground, such as a truck 32, for transportation to a site for assembly on site into an arrangement such as shown by FIG. 3a. The embodiment shown by FIGS. 3a-3c has application as an SMES for a short term utility power source.

Figure 4:
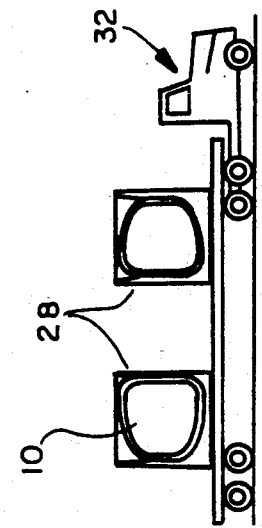

Referring to FIG. 4, a simple electrical schematic diagram of a toroidal superconducting magnetic energy storage unit is shown. An electrical power source 40 flows to control module 42. The control module 42 changes alternating current flowing from the source 40 to direct current for charging the magnet 10. When the energy stored in the magnet 10 is then needed to supply a load 44, the control module 42 changes the direct current from the magnet into alternating current to thereby discharge the magnet 10 to supply needed energy for the load 44.

Potential Applications

There are several potential applications of the disclosed SMES. It can be shown that the energy stored per unit mass in a magnet, in a flywheel, and in a compressed gas depends primarily on the ratio of allowable stress to density of the structural material and that the energy density of the magnet, flywheel and gas sphere are comparable. Furthermore, the magnet requires no moving parts in charging or extracting the stored energy. Thus the toroidal SMES can best be used for short, intense bursts of power. Superconducting magnets are best used for millisecond to second discharge times. Needs shorter than a millisecond can be served by capacitors while those longer than a minute can be served by batteries.

Energy Density Comparisons

The magnetic energy stored in a dipole, $W_m$, is:

$$W_m = \left(\frac{LI^2}{2}\right) = \frac{K\pi\mu_0 N_t^2 a^2 I^2}{2h} \qquad (1)$$

where $N_t$ is the number of turns in the coil, a is the coil radius, h is the coil height, and I is the coil current. The form factor K, is approximately h/a when h/a is small. The pressure on the inside of the coil, p, is:

$$p = \frac{k\mu_0 N_t^2 I^2}{2h^2} \qquad (2)$$

Solving for the hoop stress in the conductor, it is found that the energy which can be stored in a dipole magnet per unit of magnet mass is given by:

$$\frac{W_m}{M_m} = \frac{\sigma}{2\rho} \qquad (3)$$

where $W_m$ is the energy stored in the magnet, $M_m$ is the mass of the magnet, $\sigma$ is the tensile strength of the conductor, averaged over the winding cross-section, and $\rho$ is the average density of the coil. By comparison, the same equation applies to the energy per unit mass stored in a flywheel, $W_{fm}/M_{fm}$, having a filament wound rotor:

$$\frac{W_{fw}}{M_{fw}} = \frac{\sigma}{2\rho} \qquad (4)$$

where $\sigma$ is the average tensile stress in the rotor filaments and matrix and $\rho$ is the average rotor density.

This simple scaling indicates that SMES units can be used as a "solid-state flywheel" for short term energy storage in which power density and cycle efficiency are important.

Figure 2:
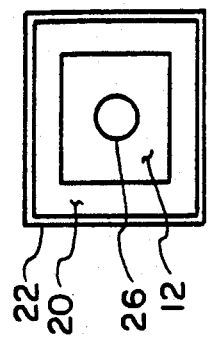
FIG. 2 is a cross section of the superconducting magnet taken at the line 2—2 in FIG. 1; and, FIG. 3a shows a plurality of large magnets arranged cylindrically.

It is possible to study the impact of possible parameters for various superconducting toroidal designs and to determine the feasibility of toroidal energy storage units for various applications. The functional relationships among the superconductor, structure, bucking cylinder and outer shell can be related so that a single, self-consistent design can be obtained as various parameters are changed. The generalized geometry use is that shown in FIG. 2.

The maximum field $B_m$, $r_1$, and $r_2$ are predetermined, while $r_0$ and k are:

$$r_0 = \sqrt{r_1 r_2} \;,\; k = \frac{1}{2}\ln\left(\frac{r_2}{r_1}\right) \qquad (5)$$

The parameter k is used in a polynomial approximation of the modified Bessel functions of $I_0$, $I_1$, and $I_2$. The modified Bessel functions are then used to determine the height of the bucking column $h_{aa}$, the turn length $l_t$, the coil area A, and the inductance of the torus L as shown in equations (6) through (9):

$$h_{aa} = 2\pi r_0 k I_1(k) \qquad (6)$$

$$l_t = 2\pi r_0 k [I_0(k) + I_1(k)] \qquad (7)$$

$$A = 2\pi R^2_0 k [I_1(2k) - e^{-k} I_1(k)] \qquad (8)$$

$$L = \frac{\mu_0 r_0 N_t^2 k^2}{2}[I_0(k) + 2I_1(k) + I_2(k)] \qquad (9)$$

where $N_t$=the total turns in the torus.

The tension T in the torus is:

$$T = \frac{\mu_0 N_t I^2 k}{4\pi} \qquad (10)$$

The overall current density in the conductor is determined from $J_{sc}$, the current density in the superconductor and stabilizer, the insulation thickness and the required coolant channel area, $A_{1N2}$. From these the required thickness and mass of the coil are determined. The characteristics of the bucking column are determined from the allowable stress and the centering forces on the coils. The time between coolant refills is determined by using the volume of the liquid nitrogen reservoir and the average thickness of the thermal insulation. After specifying the outer shell material and thickness, the mass, volume, and overall performance are determined.

EXAMPLES

Table 2 summarizes eight (8) designs for toroidal SMES units in accordance with the invention. This table is given to illustrate the invention and is not to be taken as limiting the scope of the invention which is defined by the appended claims.

The total stored energy, which is computed from the maximum filed, $B_m$, and magnet radii, is shown in the top line. The current density in the superconductor, J sc, is shown in line 5. For ease in comparison, J sc was assumed to be 50 KA/cm² in all cases. Similarly, the allowable stress in the tension-bearing part of the conductor was assumed to be 800 MPa in seven of the eight cases. The conductor current, $I_{cond}$, was chosen at a reasonable value for the potential applications. The mass of the coil is computed from the allowable stress and current density and the mass of the bucking column is determined from the size of the toroidal coils and the maximum field.

The overall diameter of the cylindrical unit, including the insulation and the outer protective shell, is $D_{outer}$, and the height and mass of the unit are $h_{total}$ and $m_{total}$. The overall mass and volumetric energy densities for the units are next shown. The time for the reservoir of liquid nitrogen to boil off is dependent on the volume of the coil bore and the assumed thickness of insulation.

TABLE 2

| | EIGHT DESIGNS FOR TOROIDAL SMES UNITS | | | | | | | |
|---|---|---|---|---|---|---|---|---|
| Case | A | B | C | D | E | F | G | H |
| E stored, MJ | 10 | 1.05 | 10.8 | 10.6 | 31.3 | 1241 | 15757 | 496400 |
| Bm, T | 5 | 15 | 15 | 10 | 20 | 15 | 10 | 15 |
| r1, mm | 700 | 200 | 400 | 480 | 1000 | 2000 | 9000 | 45000 |
| r2, mm | 1250 | 310 | 650 | 820 | 1200 | 3200 | 12000 | 50000 |
| J sc, kA/cm² | 50 | 50 | 50 | 50 | 50 | 50 | 50 | 50 |
| sigma st, MPa | 250 | 800 | 800 | 800 | 800 | 800 | 800 | 800 |
| I cond, A | 10000 | 2000 | 250 | 8000 | 1000 | 1000 | 20000 | 250000 |
| m coil, kg | 288 | 44 | 366 | 172 | 1511 | 12084 | 190100 | 14400000 |
| m bc kg | 204 | 14.7 | 50.6 | 199 | 482.7 | 21439 | 349800 | 10700000 |
| D outer, mm | 2938 | 764 | 1573 | 1916 | 2669 | 6763 | 24300 | 100750 |
| h total, mm | 1122 | 268 | 566 | 688 | 438 | 1755 | 3290 | 4218 |
| m total, kg | 2390 | 101 | 634 | 1661 | 2733 | 55872 | 1060000 | 31700000 |
| E/m total, kJ/kg | 4.19 | 10.3 | 17 | 6.4 | 11.4 | 22.2 | 14.8 | 15.65 |
| E/V total, kJ/l | 1.32 | 8.5 | 9.8 | 5.32 | 12.8 | 19.7 | 10.3 | 14.76 |
| t boiloff, hrs | 6049 | 116.5 | 294 | 1839 | 319 | 6126 | 13446 | 10700 |

The following symbols are used in Table 2:
$E_{stored}$, Mj: Stored magnetic energy
$B_m$, T: Maximum B field
$r_1$, mm, Coil inner radius
$r_2$, mm, Coil outer radius
$J_{SC}$, Ka/cm², overall current density in conductor
$sigma_{st}$, Mpa, maximum stress in unit
$I_{cond}$, A, conductor current
$m_{coil}$, kg, mass of coil
$m_{bc}$, kg, mass of bucking column
$D_{outer}$, mm, unit outer diameter
$h_{total}$, mm, total unit height
$m_{total}$, kg, total unit mass
$E/m_{total}$, Kj/kg, stored energy per unit total mass
$E/V_{total}$, KJ/l, stored energy per unit total volume
$T_{boiloff}$, hours, time between coolant refills Cases A, C and D demonstrate the parameters for energy storage units which could be used on busses and trucks making frequent stops and starts. Ten MJ is approximately the kinetic energy of a 2 t vehicle moving at approximately 110 km/hr (70 mph). The toroidal SMES units could be used to augment the electrical output of a battery or a constant speed internal combustion engine. Furthermore, the SMES could be recharged during regenerative braking, thus recovering energy for the subsequent acceleration. The 10 MJ units range in mass from 634 kg to 2390 kg, and in diameter from 1573 mm to 2928 mm. A comparison of cases A and C demonstrates the advantage of using the highest feasible field in the storage unit.

Case B contains the parameters for an automotive SMES, storing the energy (1 MJ) needed to accelerate a 2 ton vehicle to about 110 km/hr (70 mph). With a maximum field of 15 T, the unit is about the size of a spare tire. Like the busses and trucks mentioned above, the unit would be appropriate for urban driving involving frequent accelerations and stops. By using regenerative braking, the car could extend the range of conventional batteries or use a lower-powered, constant-speed internal combustion engine. The unit could operate for approximately 5 days between refills of the liquid nitrogen reservoir.

The toroidal SMES shown as Case E would be appropriate for use on a subway or commuter rail car, storing the kinetic energy of a 60 ton vehicle at 110 km/hr. The unit has been sized to fit under the passenger compartment floor.

Case F is more appropriate for shipboard use, where 1.2 GJ might be needed over a short period of time. Though this SMES, at 6.7 meters in diameter, would be impossible to transport by road or rail as a single unit, it could be divided into two convenient "half-donut" sections for movement by truck or train. This is illustrated by FIG. 4.

Cases G and H are stationary units storing 15 GJ and 500 GJ respectively. Case G was sized as a short-term utility power source (100 MWe for 2.5 minutes). Case H was sized as a power source for an electromagnetic launcher, with which a 5 ton projectile could be accelerated to sufficient velocities for insertion into earth orbit. The units would be assembled from factory-fabricated components. Case G could be assembled from 50 modules each weighing about 20 tons and fitting within a volume of 1.7 m × 3.3 m × 5 m. Case H could be assembled from within a 0.8 m × 4.3 m × 6 m volume. In each case the bucking cylinder would also be shipped as modular components and assembled on-site. With somewhat different choices of coil geometry and field, the coils used in both cases G and H could be identical, allowing varying amounts of stored energy by arraying the coils in a smaller or a larger diameter circle.

The foregoing description of preferred embodiments of the invention has been presented for purposes of illustration and description. It is not intended to be exhaustive or to limit the invention to the precise form disclosed, and obviously many modifications and variations are possible in light of the above teaching. The embodiments were chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which exclusive property rights or privileges are claimed are defined as follows:

1. A superconducting magnetic energy storage unit comprising:
   a) a plurality of constant tension superconducting magnets toroidally wound, the magnets including substantially D-shaped coils having a straight back section and an inner bore, and connected together to form a substantially cylindrical unit, the magnets each including: superconducting wire surrounded by a support structure; and electrical insulation surrounding the wire and support structure;
   b) a bucking column connected to the straight back section of the coils such that it is surrounded by the magnets for bearing the center force along the straight back section of the coils,
   and wherein energy is stored in a magnetic field by applying a current to the magnet, and further in which energy is withdrawn from the magnet by reducing the current, the magnetic field being contained only within the bore of the magnet with virtually no external magnetic field.

2. The superconducting magnetic energy storage unit of claim 1 wherein the superconducting magnets are resuspended in a metal shell containing thermal insulation.

3. The superconducting magnetic energy storage unit of claim 2 wherein the superconducting wire includes a channel containing cryogenic coolant.

4. The superconducting magnetic energy storage unit of claim 3 wherein the inner bore of the D-shaped coils of the magnet provides a volume for storing cryogenic coolant to be supplied to the channel in the superconducting wire.

5. In an automotive vehicle having a battery producing an electrical output, a superconducting magnetic energy storage unit for augmenting the electrical output of the battery comprising:
   a plurality of superconducting magnetic constant tension D-shaped coils having a straight back section and an inner bore, wound toroidally, and connected together to form a substantially cylindrical unit; a bucking column connected to the straight back section of the coils such that it is surrounded by the coils and bears the center force along the straight back section of the coils, and in which energy is stored in a magnetic field by applying a current to the magnet, and further in which energy is withdrawn from the magnet by reducing the current, the magnetic field being contained only within the bore of the magnet.

6. The superconducting magnetic energy storage unit of claim 5 wherein the superconducting coil includes a cryogenic coolant channel, and the inner bore of the magnet includes a volume for storing cryogenic fluid to be supplied to the coolant channel, whereby the superconducting magnetic energy storage unit is cooled by the cryogenic coolant.

7. The superconducting magnetic energy storage unit of claim 6 wherein the unit is capable of storing energy sufficient to accelerate the vehicle to about seventy milers per hour.

8. The superconducting magnetic energy storage unit of claim 7 wherein the unit is capable of being recharged during regenerative braking of the vehicle, thereby recovering energy needed for subsequent acceleration.

* * * * *